US00RE35354E

United States Patent [19]

Kersten et al.

[11] E Patent Number: Re. 35,354

[45] Reissued Date of Patent: Oct. 22, 1996

[54] PACK FOR FREE-FLOWING FILLER

[75] Inventors: Jens-Heinrich Kersten, Kamen-Heeren; Detlef Schmitz, Lunen; Peter Runte, Unna-Hemmerde, all of Germany

[73] Assignee: Perfect-Valois Ventil GmbH, Dortmund, Germany

[21] Appl. No.: 418,947

[22] Filed: Apr. 7, 1995

Related U.S. Patent Documents

Reissue of:

[64] Patent No.: 5,328,060
Issued: Jul. 12, 1994
Appl. No.: 65,614
Filed: May 21, 1993

[30] Foreign Application Priority Data

May 21, 1992 [DE] Germany ..... 42 16 915.1

[51] Int. Cl.[6] ..... B65D 37/00

[52] U.S. Cl. ..... 222/209; 222/211; 239/357; 239/363

[58] Field of Search ..... 222/209, 211–213, 222/321.7, 382, 383.1, 398, 400.7, 401, 481.5; 239/327, 331, 340, 356, 357, 362, 363, 372, 423, 424

[56] References Cited

U.S. PATENT DOCUMENTS 2,098,160 11/1937 Perritt ..... 222/209
3,618,829 11/1971 Elmore et al. ..... 222/209
4,915,601 4/1970 von Schuckmann ..... 222/321
5,120,438 6/1992 Nakagawa et al. ..... 222/209

FOREIGN PATENT DOCUMENTS 2630712 11/1989 France ..... 222/401

*Primary Examiner*—Andres Kashnikow
*Assistant Examiner*—Philippe Derakshani
*Attorney, Agent, or Firm*—Dressler, Goldsmith, Shore & Milnamow, Ltd.

[57] ABSTRACT

The invention comprises a synthetic pack, in the filler container (11) of which there is integrated a compression spring element (16), against whose resistance a dispensing head (12) can be moved downwards with its carrier (18) of the filler container (11) and the filler can be pressurized. A ventilation valve (50) is herewith closed prior to the opening of a dispensing valve (22), which is circuit-connected into a product duct formed by a lifting tube (15) and product ducts (27, 40, 14). The dispensing head (12) is sealtight on the carrier (18) of the filler container (11), but is twistable between a closed position and an open position, the product duct (14, 40) of the dispensing head (12), in the open position, being aligned with the product duct (27) in a lifting tube nipple (20) and the ventilation valve (50) of the dispensing head (12) being aligned with a ventilation opening (29) in a headplate (19) of the carrier (18). With the pack (10), a high spraying quality is obtained, in conjunction with convenient handling, the dispensing head (12) simultaneously forming a transport seal for the pack.

12 Claims, 2 Drawing Sheets

PACK FOR FREE-FLOWING FILLER

Figure 1:
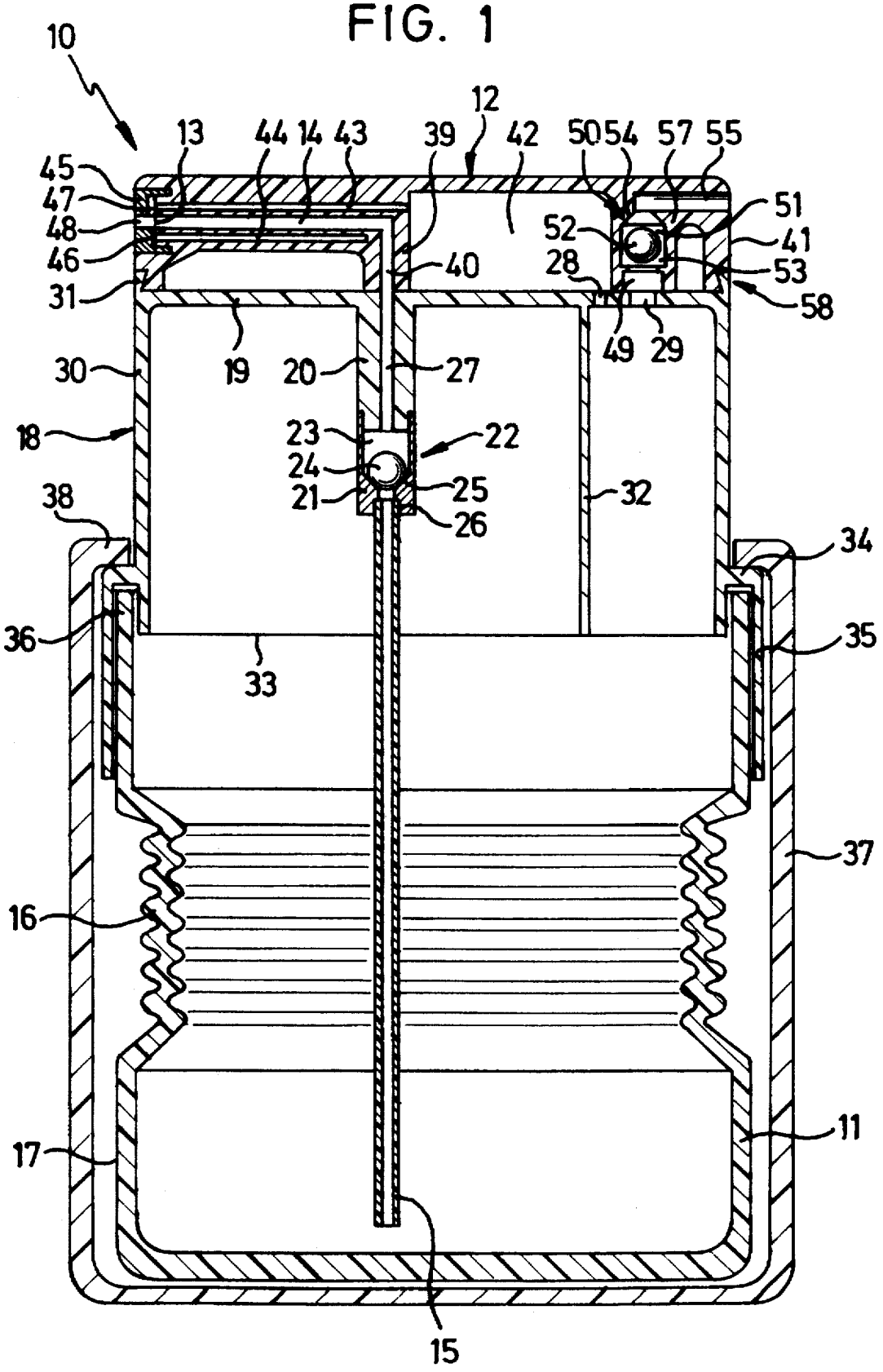

Matter enclosed in heavy brackets [ ] appears in the original patent but forms no part of this reissue specification; matter printed in italics indicates the additions made by reissue.

The invention relates to a pack having a handpump for dispensing free-flowing filler,, having a filler container on which there is movably disposed, for the actuation of the pump, a dispensing head, which is provided with an outlet opening linked by a product duct and a lifting tube to the interior of the filler container.

For environmental reasons, formulations of various spray products are being converted to water-based solutions. Moreover, the use of any propellants apart from air is also becoming increasingly problematical. This leads to difficulties in obtaining satisfactory spraying results in terms of the achievable particle size of the spray. Some assistance is offered here by the application of the Venturi principle. It has been shown, however, that the operating convenience of those currently known packagings working on the Venturi principle has certain disadvantages in relation to other systems. This has hitherto severely limited the use of spray packagings working on the Venturi principle.

The object of the invention is to improve packs of the abovementioned known generic type, such that a high spray-jet quality is achieved comparable to previously known aerosol packs, a spray head which is movable in the direction of the principal axis of the pack allows for more convenient actuation, the spray direction runs approximately perpendicular to the principal axis of the pack, a seal is integrated for the transportation of the pack without any additional protective cap, an adaptation to fillers of widely varied properties, e.g. liquids of widely varied viscosity, as well as creams and powders, is possible by modification of the lifting tube and nozzle, the entire pack, with a view to good reusability, can be made exclusively from one material and can be designed, where appropriate, as a reusable pack.

The invention achieves this object by the fact that a compression spring element forms an integral component part of the filler container and is effective, with a view to stretching the said container, in the longitudinal direction of the latter;

that a carrier for the dispensing head is mounted in a sealtight manner onto the opening of the filler container and is provided with a headplate on whose underside there is disposed, eccentrically to the principal axis of the filler container, a lifting tube nipple to which the upper end of the lifting tube is connected and whose product duct extends through the headplate;

that assigned to the lifting tube nipple is a dispensing valve, which is open whenever the pressure in the filler container lies above the pressure of the external atmosphere;

that the headplate is provided with a pass-through opening for operating air and with a pass-through opening for ventilating air, which are disposed eccentrically to the principal axis of the filler container;

that the dispensing head is disposed in a sealtight manner on the top side of the carrier, but so as to be rotatable between a closed position and an open position, and exhibits on its underside an inlet connecting socket with a product duct which, in the dispensing position of the dispensing head, is aligned with the product duct of the lifting tube nipple and which extends from the upper end of the inlet connecting socket radially outwards up to a dispensing opening in a contacting surface of the dispensing head; that an operating air duct in the dispensing head extends parallel to the radial product duct up to its dispensing opening;

that a nozzle exhibits an outlet opening and is mounted onto the dispensing opening of the dispensing head, the nozzle being provided on its rear side with a centrifugal chamber, into which the operating air duct opens out and which is connected into the outlet opening of the nozzle;

that a ventilation duct in the dispensing head is aligned with the ventilation opening in the headplate of the carrier in the operating position of the dispensing head and is provided with a ventilation valve, which is open in the event of underpressure in the filler container.

Advantageous refinements of the invention are contained in claims 2 to 12.

Figure 2:
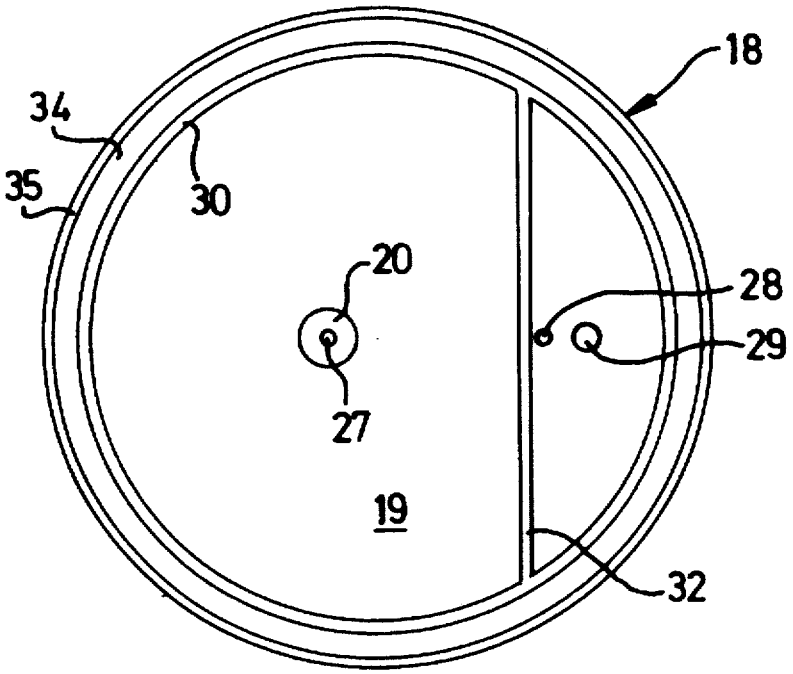
Figure 3:
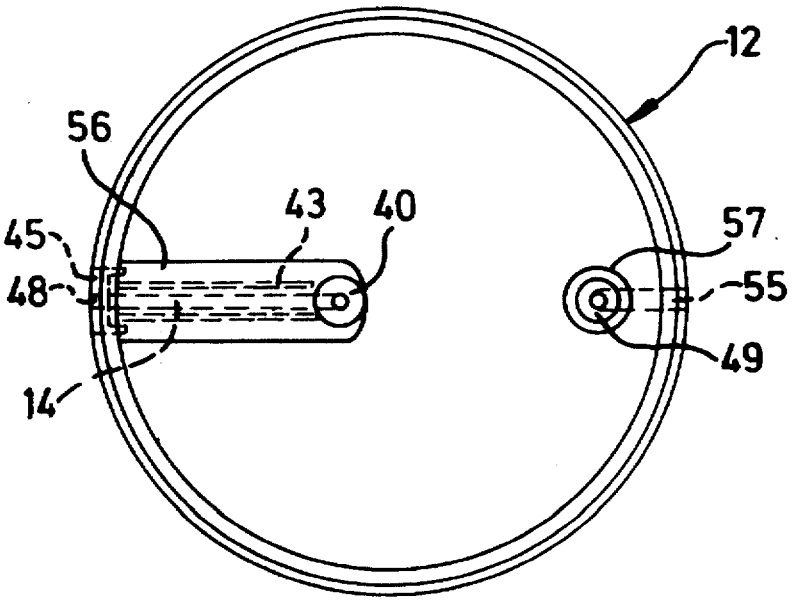

The invention is explained more fully below, in further detail, with reference to the schematic drawing of an illustrative embodiment, in which:

FIG. 1 shows the pack according to the invention in a central longitudinal section, FIG. 2 shows a bottom view of a top part of a filler container and FIG. 3 shows a bottom view of a dispensing head.

In FIG. 1, a pack 10 made of synthetic material, such as polyethylene, is shown with a handpump for dispensing free-flowing filler. On a filler container 11 there is movably disposed for the actuation of the pump, a dispensing head 12. The dispensing head 12 is provided with an outlet opening 48, which is linked by a product duct 14, 27, 40 and a lifting tube 15 to the interior of the filler container 11.

A compression spring element 16 is an integral component part of the wall 17 of the filler container 11 and is shaped in the style of a concertina bellows. The compression spring element 16 is effective, with a view to stretching the container wall 17, above the compression spring element 16 in both directions of the principal axis of the filler container 11.

A carrier 18 for the dispensing head 12 is mounted in a sealtight manner onto the opening of the filler container 11. The carrier 18 is provided with a headplate 19, on the underside of which there is disposed, eccentrically to the principal axis of the filler container 11, a lifting tube nipple 20. Onto the lower end of the lifting tube nipple 20 there is mounted a housing 21 for a dispensing valve 22, which exhibits, towards the upper end, a widened bore 23 in which a ball valve 24 is movably disposed. The bore 23 is constricted under the formation of a conical valve seat 25 for the ball valve 24, the diameter of which valve seat corresponds approximately to that of the product duct 27 in the lifting tube 15, which bore is widened towards the lower end of the housing 21, to form a receiving opening 26 for the upper end of the lifting tube 15. The product (duct 27 in the lifting tube nipple 20 extends through the headplate 19 of the carrier 18. The dispensing valve 22 circuit-connected into the product duct 27 is open whenever the pressure in the filler container 11 lies above the pressure of the external atmosphere.

The headplate 19 of the carrier 18 is provided with a pass-through opening 28 for operating air and with a pass-through opening 29 for ventilating air. Both pass-through openings 28, 29 are disposed eccentrically to the principal axis of the filler container 11 in a plane lying diametrically to the principal axis, in which plane the product duct 27 of the lifting tube nipple 20 also extends. The pass-through opening 29 for ventilating air thus constitutes a ventilation opening for the interior of the filler container 11, which opening exhibits a substantially larger cross-section than the operating air opening 28. Consequently, the ventilation valve reacts to changes in pressure earlier than the dispensing valve 22 for the product.

The carrier 18 of the filler container 11 can be detaching connected to the letter. The detachable connection can comprise an airtight snap-on connection or, indeed a screw thread. Both types of connection are known from the prior art and are therefore not specifically represented. The carrier 18 is of capshaped configuration. An upper casing section 30 of the carrier 18 protrudes upwards over its headplate 19 in the form of a collar 31 and forms with the headplate 19 an indentation into which the dispensing head 12 twistably engages. The engagement of the dispensing head 12 into the collar 31 of the top part 18 can be achieved by a latch-locking or snap-on connection 58 by means of undercuts on the inner wall of the collar 31 and on the lower edge of the outer peripheral surface 41 of the dispensing head 12, in the manner generally known in the art, to be more precise in such a way that those parts on the underside of the dispensing head 12 which come into contact with the headplate 19 of the carrier 18 bear in a sealtight manner upon the top side of the headplate 19.

It can be seen from FIG. 2 that a partition 32 extends from the underside of the headplate 19 of the carrier 18, between the lifting tube nipple 20 and the pass-through opening 28 for operating air, up to the lower edge 33 of the upper casing section 30 of the carrier 18, running parallel to the principal axis of the said carrier and perpendicular to the radial plane in which the pass-through openings 28, 29 for operating air or ventilating air and the lifting tube nipple 20 are disposed. The partition 32 enables the filler to be sprayed without trouble, even where the spraying or outlet opening 48 is inclined downwards at an angle of up to about 45°.

Attached to the outer side of the upper casing section 30 of the carrier 18 there is an outer shoulder 34, from whose outer edge a lower casing section 35 extends downwards and, partially together with the lower edge 33 of the upper casing section 30, overlaps the upper, open edge 36 of the filler container 11 and is fastened thereon, as already mentioned, in a sealtight manner, e.g. by means of a screw thread or snap-on seat.

FIG. 1 shows that the filler container 11 is inserted into a cartridge 37, the upper edge 38 of which is bent radially inwards at right-angles and overlaps the outer shoulder 34 of the lower casing section 35 of the carrier 18. In this way, the rest or home position of the carrier 18 is determined. The dispensing head 12 disposed twistably above the headplate 19 of the carrier 18 is shown in FIG. 1 in the operating or dispensing position. The dispensing head 12 exhibits on its underside an inlet connecting socket 39 for a product duct 40, which is aligned with the product duct 27 in the lifting tube nipple 20 and has the same cross-section. From the upper end of the inlet connecting socket 39, there extends, on the underside, a radial rib 56 (FIG. 3). This rib 56 contains a product duct 14, which is guided radially outwards up to a dispensing opening 13 in a peripheral surface 41 of the dispensing head 12.

FIG. 1 further shows that the operating air opening 28 is linked to a chamber 42 on the underside of the cap-shaped dispensing head 12. The operating air opening 28 in the headplate 19 of the carrier 30 is linked by this chamber 42 to an operating air duct 43, which extends tends parallel to the radial product duct 14 in the rib 56 of the dispensing head 12 up to its dispensing opening 13 in the peripheral surface 41 of the dispensing head 12. This operating air duct 43 is linked to at least one further operating air duct 44, running parallel thereto, which extends on the underside of the radial product duct 14, likewise in the rib 56, up to the dispensing opening 13. A nozzle 45 is mounted onto the dispensing opening 13 of the dispensing head 12 in such a way that the outer surface of the nozzle 45 is aligned with the peripheral surface 41 of the dispensing head 12. The nozzle 45 is provided on its rear side with a recess 46, into which the operating air duct 43, 44 opens out and which forms a centrifugal chamber 47, which opens radially into the outlet opening 48 of the nozzle 45, the outlet opening 48 being aligned coaxially to the radial product duct 14.

In the operating position shown in FIG. 1, there is located above the ventilation opening 29 in the headplate 19 of the carrier 18, a vertical ventilation duct 49, whose opening, facing the headplate 19 of the carrier 30, is aligned with the ventilation opening 29 and which is provided with a ventilation valve 50, this being open in the event of underpressure in the filler container 11. A section 51 of the ventilation duct 49 directed parallel to the principal axis of the pack 10 exhibits, for the reception of a ball valve 52, a widened bore 53, which tapers off at the upper end into a conically tapered valve seat 54. Above the valve seat 54, the ventilation duct section 51 is bent outwards at right-angles radially to the principal axis of the dispensing head 12 and opens into a suction opening 55 in the peripheral surface 41 of the dispensing head 12. FIG. 3 shows that the ventilation valve 50 is disposed in a projection on the underside of the dispensing head 12, the radial suction duct 55 likewise being disposed in a rib-like reinforcement 57 on the underside of a closed cover wall 58 of the dispensing head 12.

The eccentric fitting both of the product ducts and the air ducts 27, 40, 28, 29, 49 makes it possible, by twisting the dispensing head 12 on the carrier 30 of the pack 10, either to open or close all of the said ducts. The open or closed position of the dispensing head 12 is defined by stops (not shown) or by latchlocking seats in the dispensing head 12 and the carrier, as these are generally known from the prior art and are not therefore represented.

The pack is actuated by the operator pressing the dispensing head 12 downwards in the direction of the filler container 11. As a result of the reduction in the inner capacity of the filler container 11, the internal pressure obtaining therein is increased. As a result of the increased internal pressure in the filler container 11, the ventilation valve 50 in the dispensing head 12 is initially closed. The pressurized air present above the level of the liquid in the filler container 11 consequently flows through the passthrough opening 28 into the chamber 42 and from there through the radial operating air duct 43, 44 and outwards, via the centrifugal chamber 47, to the outlet opening 48 in the nozzle 45. An underpressure is thereby generated at the dispensing opening 13 of the product duct 14, so that the dispensing valve 22 is opened and the filler flows through the lifting tube 15 and the dispensing valve 22 into the product ducts 27, 40 and 14 up to the dispensing opening 13 and mixes in the nozzle 45 with the outflowing air and is atomized.

At the end of the pump stroke executed by the downward motion of the dispensing head 12, the dispensing head 12 is released. The compression spring element 16 of the filler container 11 relaxes, the carrier 18 with the thereon seated dispensing head 12 returning into the upper rest position.

The outer shoulder 34 thereupon butts against the underside of the upper edge 38 of the cartridge 37. In addition, upon the return of the carrier 30 with the dispensing head 12, the said outer shoulder opens the ventilation valve 50 and enables the space above the level of the liquid in the filler container 11 to be rapidly ventilated.

Since the compression spring element 16 forms an integral component part of the filler container 11, it is evident that all parts, including the ball valves 24 or 52, can be made from the same synthetic material, so that good pack reusability is assured. Moreover, the base of the cartridge 37 could be configured so as to be detachable, enabling the pack 10 to be removed through a base opening in the cartridge 37 and an emptied filler container 11 then either to be refilled with the contents of a refill pack or indeed exchanged for another full filler container 11. The base of the cartridge 37 is then reclosed. The cartridge base could be screw-connectable to the cartridge 37 or hinge-connected in the form of a lid and provided with a snap lock, as is known from the prior art and is not therefore represented.

We claim:

1. A pack having a handpump for dispensing free-flowing, filler having a filler container on which there is movably disposed, for the actuation of the pump, a dispensing head, which is provided with an outlet opening linked by a product duct and a lifting tube to the interior of the filler container, wherein a compression spring element forms an integral component part of the filler container and is effective, with a view to stretching the said container, in the longitudinal direction of the latter;

a carrier for the dispensing head is mounted in a seal-tight manner onto the opening of the filler container and is provided with a headplate on whose underside there is disposed, eccentrically to the principal axis of the filler container, a lifting tube nipple to which the upper end of the lifting tube is connected and whose product duct extends through the headplate;

assigned to the lifting tube nipple is a dispensing valve, which is open whenever the pressure in the filler container lies above the pressure of the external atmosphere;

the headplate is provided with a pass-through opening for operating air and with a pass-through opening for ventilating air, which are disposed eccentrically to the principal axis of the filler container;

the dispensing head is disposed in a sealtight manner on the top side of the carrier, but so as to be rotatable between a closed position and an open position, and exhibits on its underside an inlet connecting socket with a product duct which, in the dispensing position of the dispensing head, is aligned with the product duct of the lifting tube nipple and which extends from the upper end of the inlet connecting socket radially outwards up to a dispensing opening in a contacting surface of the dispensing head;

an operating air duct in the dispensing head extends parallel to the radial product duct up to its dispensing opening;

a nozzle exhibits an outlet opening and is mounted onto the dispensing opening of the dispensing head, the nozzle being provided on its rear side with a centrifugal chamber, into which the operation air duct opens out and which is connected to the outlet opening of the nozzle;

ventilation duct in the dispensing head is aligned with the ventilation opening in the headplate of the carrier in the operating position of the dispensing head and is provided with a ventilation valve, which is open in the event of underpressure in the filler container.

2. The pack as claimed in claim 1, wherein the compression spring element of the filler container is shaped in the style of a concertina bellows.

3. The pack as claimed in claim 1, wherein the carrier is detachably connected to the filler container.

4. The pack as claimed in one of claims 1, 2 or 3, wherein the carrier is of cap-shaped configuration.

5. The pack as claimed in claim 4, wherein a cap-shaped casing section of the carrier protrudes upwards over its headplate and forms with this an indentation into which the dispensing head can be inserted with the latch-locking seat on the inner side of the casing section.

6. The pack as claimed in claim 1, wherein a housing of the dispensing valve exhibits, towards the upper end, a widened bore, in which a ball valve is movably disposed and which is conically constricted to form a valve seat for the ball valve, the diameter of which valve seat corresponds approximately to that of the product duct in the lifting tube, and is widened, towards the lower end of the housing, to form a receiving opening for the upper end of the lifting tube.

7. The pack as claimed in claim 1, wherein the passthrough openings for the operating air and ventilation air are disposed on one side of the principal axis of the carrier and the lifting tube nipple is disposed on the other side of the principal axis in a common radial plane of the principal axis of the carrier.

8. The pack as claimed in claims 1 or 7, wherein a partition extends from the underside of the headplate of the carrier, between the lifting tube nipple and the passthrough opening for operating air, up to the lower edge of an upper casing section of the carrier, running parallel to the principal axis of the said carrier and perpendicular to the radial plane of the passthrough openings for operating air and ventilating air and of the lifting tube nipple.

9. The pack as claimed in claim 8, wherein attached to the outer side of the upper casing section of the carrier there is an outer shoulder, from whose outer edge a lower casing section extends downwards and, partially together with the lower edge of the first, upper casing section, overlaps the upper, open end of the filler container.

10. The pack as claimed in claim 1, wherein the ventilation duct in the dispensing head, with the inlet connecting socket and the product duct, leading to the dispensing opening, of the dispensing head, are disposed in a diametrical plane of the dispensing head.

11. The pack as claimed in one of claims 1 or 10, wherein a section of the ventilation duct directed parallel to the principal axis of the dispensing head exhibits, for the reception of a ball valve, a larger cross-section and tapers off at the upper end into a conically tapered valve seat, the ventilation duct being bent outwards at right-angles radially to the principal axis of the dispensing head and opening out in a suction opening on the contacting surface of the dispensing head.

12. The pack as claimed in one of claims 1, 2, 3, 6, 7 or 10 wherein the filler container is inserted into a cartridge, the upper edge of which is bent radially inwards at right-angles and overlaps the outer shoulder of the lower casing section of the carrier.

* * * * *